US005367756A

United States Patent [19]

Huetinck

[11] Patent Number: 5,367,756

[45] Date of Patent: Nov. 29, 1994

[54] GAS METER RISER TRANSITION FIELD COMPLETION TOOL

[75] Inventor: Mark E. Huetinck, Brea, Calif.

[73] Assignee: R. W. Lyall & Company, Inc., Corona, Calif.

[21] Appl. No.: 163,292

[22] Filed: Dec. 7, 1993

[51] Int. Cl.[5] .............................................. B23P 19/02

[52] U.S. Cl. ...................................... 29/237; 29/283.5; 29/263

[58] Field of Search ................. 29/237, 263, 251, 256, 29/282, 283, 283.5, 234, 235; 72/454; 285/256

[56] References Cited

U.S. PATENT DOCUMENTS

| | | | |
|---|---|---|---|
| 1,848,867 | 3/1932 | Callaway . | |
| 2,821,775 | 2/1958 | Pavelka . | |
| 3,858,298 | 1/1975 | Whitledge et al. | 29/263 |
| 3,859,837 | 1/1975 | Burroughs | 29/237 |
| 4,271,576 | 6/1981 | Gunning . | |
| 4,635,972 | 1/1987 | Lyall . | |
| 4,785,517 | 11/1988 | Takano | 29/237 |
| 4,801,159 | 1/1989 | Sehorn . | |
| 4,977,660 | 12/1990 | Maynard | 29/251 |
| 5,048,169 | 9/1991 | Beggiato . | |
| 5,138,755 | 8/1992 | Evans et al. . | |
| 5,203,062 | 4/1993 | Nishia | 29/237 |

*Primary Examiner*—Robert C. Watson

*Attorney, Agent, or Firm*—Fulwider, Patton, Lee & Utecht

[57] ABSTRACT

A field completion tool including a open frame formed on the top end with a yoke including a centrally located threaded drive bore receiving a threaded drive shaft having a spigot thrust fitting on the bottom end thereof. The frame includes on the bottom end an oversized hex nut which forms a clearance bore that may optionally be threaded but which is of sufficient size to telescope over a plastic pipe projecting upwardly from the top end of a meter riser which is telescoped over the length of a plastic pipe projecting from an underground gas utility distribution system. The frame includes a handle for grasping with one hand and may be used to rotate the frame to thread the hex nut to couple the frame to the top end of the meter riser. The frame has a clamping means which blocks relative movement of the upwardly projecting plastic pipe relative to the frame. A drive shaft includes a crank for grasping with the other hand so that the shaft may be rotated to selectively advance the thrust fitting engaged with a spigot to drive the spigot into the free end of the plastic pipe. The clamping means may be released and the drive shaft further advanced to draw such riser up over the free end of the plastic pipe.

16 Claims, 2 Drawing Sheets

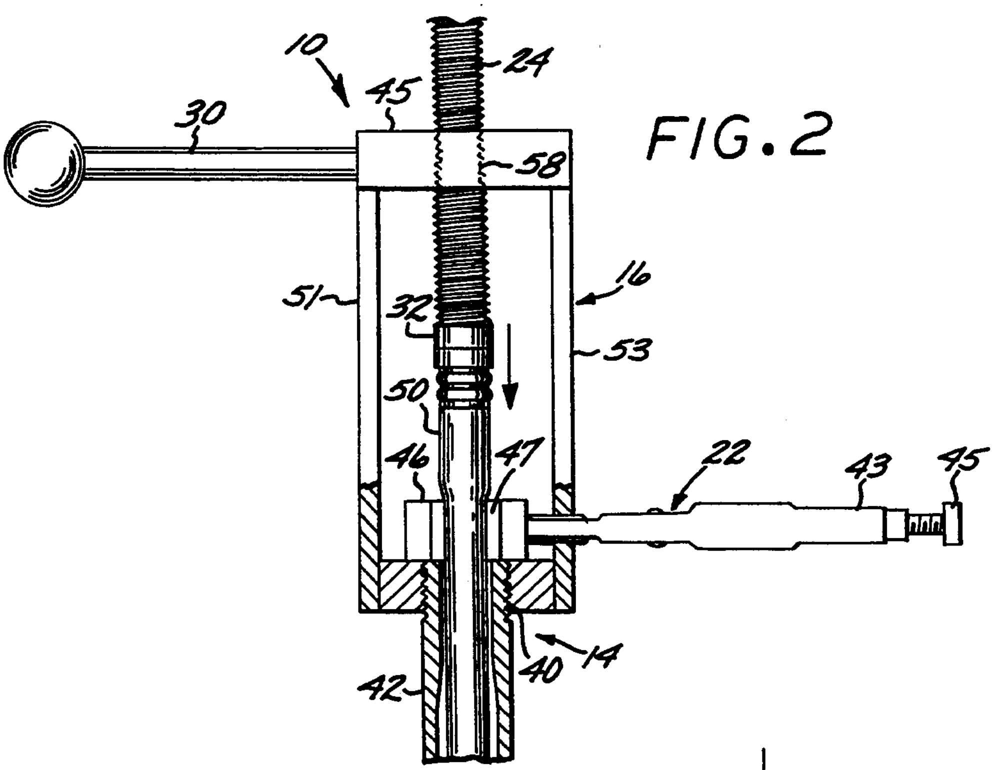
FIG. 2
FIG. 3
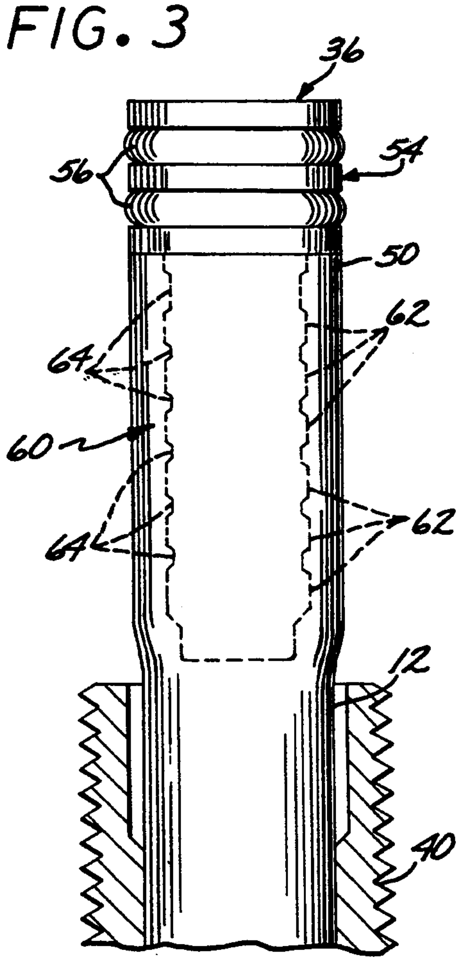
FIG. 4
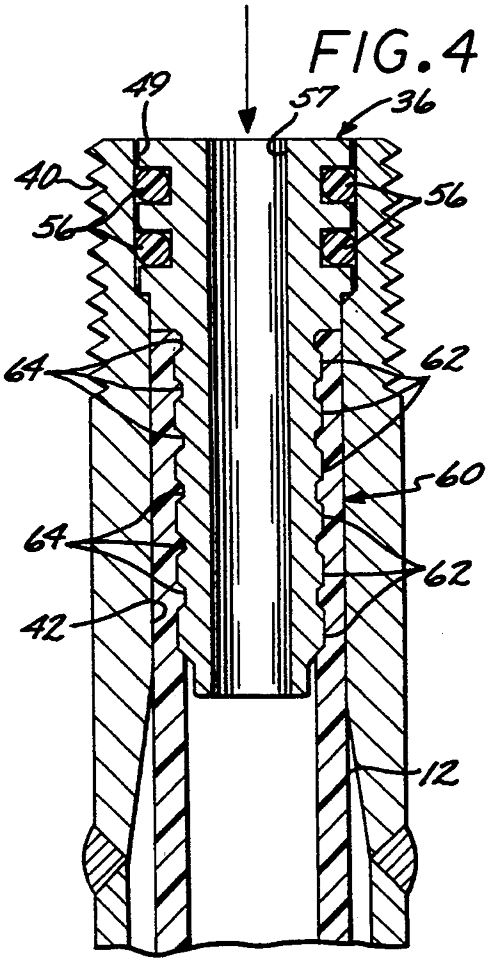

GAS METER RISER TRANSITION FIELD COMPLETION TOOL

BACKGROUND OF THE INVENTION

1. Field of the Invention

The present invention relates to a tool for forming a transition from an underground plastic pipe to, for instance, a metallic above ground gas meter riser.

2. Description of the Prior Art

Modern gas utilities have broadly adopted plastic pipe for use with underground natural gas distribution and transmission systems. Consequently, many local and state governmental regulatory agencies have adopted safety codes which require above ground gas meter risers to be constructed of relatively rigid and durable metallic materials which protect against deterioration and external damage of an otherwise plastic riser assembly. Therefore, it is necessary to transition such subterranean plastic pipe to metallic risers for above ground use. It has been common practice to make that transition by means of a riser transition assembly pre-fabricated on a factory assembly line by inserting a length of plastic pipe into a metallic riser elbow and utilizing a completion spigot which expands the wall of the top extremity of the plastic pipe radially outwardly to be compressed by a finishing sleeve of the metallic riser to thereby provide a threaded coupling for attachment to a gas meter or the like.

A spigot and sleeve arrangement, as shown in U.S. Pat. No. 4,293,147 to Metcalfe et al. and licensed to applicant's assignee, has been found satisfactory for forming a spigot and sleeve joint. A factory fabricated transition assembly of this type is shown in U.S. Pat. No. 4,801,159 to SEHORN. While satisfactory for its intended purpose, it would, without a satisfactory tool for completion in the field, have little utility in an application where the spigot and sleeve joint were to be completed in the field. Oftentimes, for a factory assembly line operation, the character of the tool employed to insert the spigot or draw on the finishing sleeve is given little attention, since portability and compactness is of little concern.

As set forth in co-pending patent application Ser. No. 08/163,471, filed concurrent herewith, and assigned to the assignee of the rights in the present invention, there exists a need for a procedure whereby the transition fitting might be conveniently and reliably performed at the installation site by relatively unskilled personnel. The integrity of the final connection depends to a great degree on the ease with which the joint may be completed. Any completion tool, to be practical for use in the efficient and reliable completion of a joint, must be lightweight, compact and convenient for the workmen to use in a foolproof manner to complete a high integrity joint. These requirements are particularly true for field applications where the work must be performed oftentimes in an environment which lacks the comparatively ideal conditions of a factory setting. It is preferable if the same tool can conveniently be employed both to efficiently insert the spigot into the end of the plastic pipe to expand the wall to a flare and then draw the metal riser, including the finishing sleeve, over the expanded flare to form the seal between the riser and the plastic pipe.

Because a great number of such transitions are required in residential and commercial developments, a tool to assemble such transitions efficiently and economically is highly desirable. Due to the high flammability of natural gas, great importance is placed on the resultant integrity of the completed riser assembly and accompanying transition connections to plastic pipe.

It is therefore the object of the present invention to provide a tool, with the attribute for ease of operation, which allows rapid efficient completion of a transition between an above ground metallic gas riser pipe and an underground plastic gas transmission pipe, while producing a transition of high resultant integrity.

SUMMARY OF THE INVENTION

The present invention provides a field completion tool to transition a plastic underground gas transmission pipe to a metallic gas meter riser pipe. The riser pipe is telescoped over a free extremity of the underground plastic pipe at an excavated pit in the field. The field completion tool may then be threadedly attached to the riser pipe at the upper end thereof. The riser pipe is telescoped far enough over the plastic pipe beyond the upper end of the riser pipe to expose a length of plastic pipe for access by the field completion tool. The riser pipe includes an integral finishing sleeve at its upper end thereof. A spigot is provided and includes a nipple with concentric ribs formed thereon configured to be telescopically received in the end of the plastic pipe. The riser pipe is drawn up over the nipple to register the finishing sleeve therewith and flow the wall of the plastic pipe into the grooves formed between the nipple ribs to provide a fluid tight joint.

The field transition completion tool includes an open frame having a bottom wall in the form of an oversized threaded nut to screw onto the threaded top end of the metallic riser pipe. The open frame has a top wall formed with a threaded bore for receipt of a threaded drive rod having on the bottom end a thrust fitting formed with a reduced-in-diameter spigot retainer. Mounted on the top end of the drive rod is a crank arm.

In one embodiment, the threaded bore of the nut forming the bottom wall acts as a clearance hole so that a length of the plastic pipe projecting above the top end of the riser pipe can be extended therethrough and clamped thereabout to anchor the tool relative to the plastic pipe. The drive rod may then be rotated to drive the thrust fitting down against a spigot placed over the open end of the plastic pipe to drive such spigot into the pipe and flare the walls thereof outwardly. In another embodiment, the nut may be screwed onto the top end of the riser, with such spigot in place, to thus engage such thrust fitting with the spigot so that continued advancement of the drive rod will draw the riser, including the finishing sleeve, further upwardly over the flared plastic pipe to squeeze the wall material radially inwardly to form a secure seal between such plastic pipe and riser pipe.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 2 is a partially sectioned side view, in reduced scale, of the gas meter field assembly tool depicted in FIG. 1, showing the partial assembly of the gas riser transition;

FIG. 3 is a side view, in enlarged scale and partially sectioned, of the partially assembled gas meter riser transition shown in FIG. 2; and FIG. 4 is a sectional side view, in enlarged scale similar to FIG. 3, of an assembled riser transition completed by the tool shown in FIG. 1.

DETAILED DESCRIPTION OF THE PREFERRED EMBODIMENT

Figure 1:
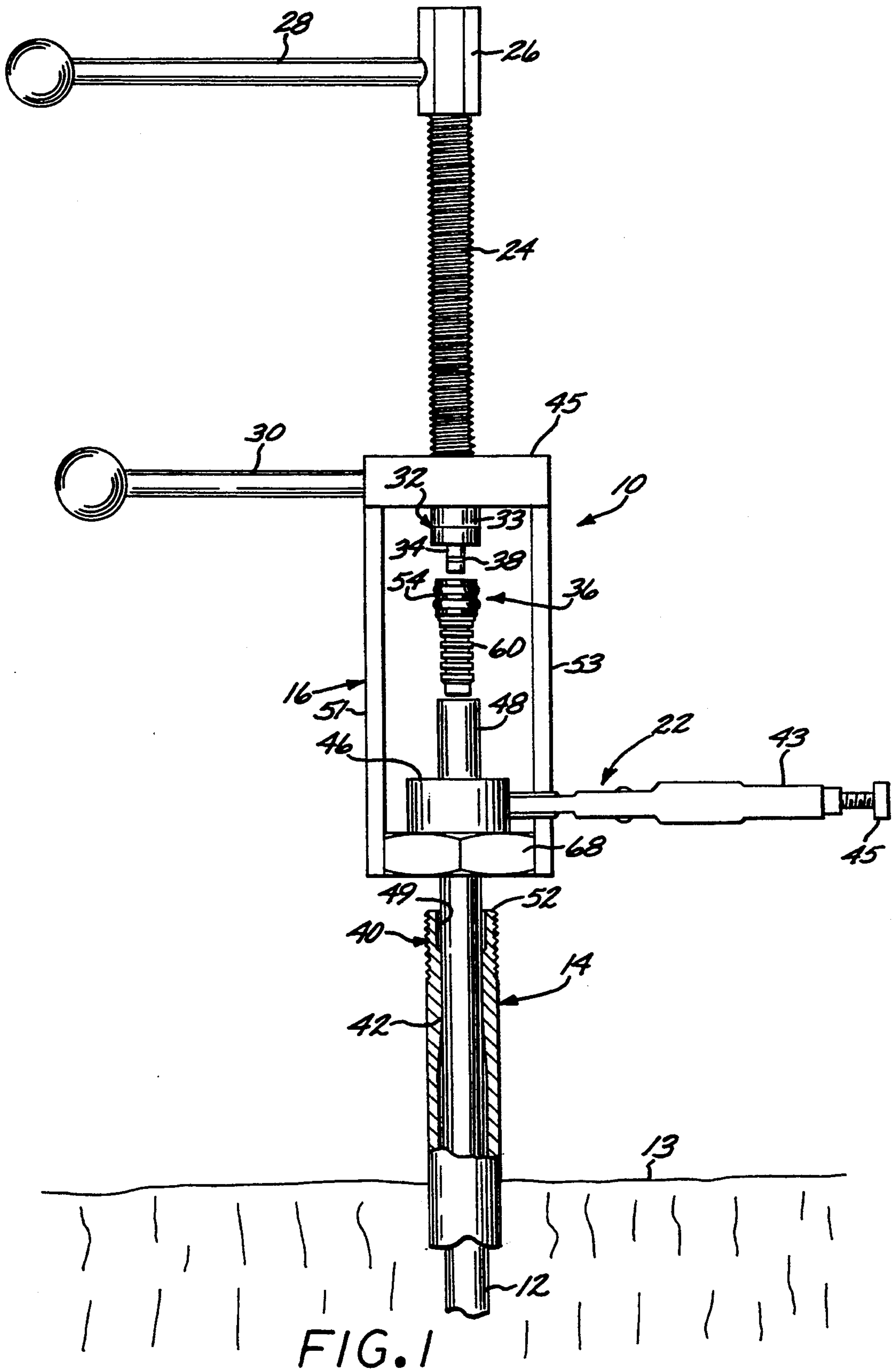
FIG. 1 is an exploded, partially sectioned side view of a gas meter riser transition field assembly tool incorporating the present invention in use with a gas riser transition assembly.

Referring to the drawings for purposes of illustration, with particular reference given to FIGS. 1 and 2, the invention is embodied in a field transition completion tool, shown generally at 10, for use in inserting a spigot, generally designated 36, into the open end of the plastic underground gas transmission pipe 12 to transition to an L-shaped metallic gas meter riser pipe terminating at a top end, shown generally at 14, and projecting above ground level 13. The top extremity of the metallic riser pipe is formed integrally with a reduced-in-diameter internal cylindrical gland 49 and a further reduced-in-diameter finishing sleeve 42, and formed with external threads 40 at the top end thereof. Referring to FIGS. 1 and 2, the field transition completion tool 10 includes, generally, a rectangular open frame 16, formed with a bottom in the form of a hex nut 68 defining a threaded clearance bore 19 for coupling to the riser pipe 14. The top of such frame is in the form of a yoke 45 formed centrally with a threaded drive bore 58 aligned on the central axis of the tool for receipt of a threaded drive rod 24 to be aligned centrally over the clearance bore 19. The second wall includes a hand grip with a handle 30 mounted thereon. The drive rod includes on its bottom end a thrust bearing 33 formed to engage against a spigot 36 to be driven into the upper length 48 of the plastic pipe 12.

Plastic pipe, formed of materials such as polyethylene, has gained popularity with public and private utilities for transporting different fluids such as gas and water. With regard to gas transportation, typical local and state regulations incorporate safety limitations that require above ground piping to be constructed of relatively sturdy and durable materials such as metal to prevent the above ground projection of unprotected plastic pipe which might be susceptible to damage and consequent leakage. The challenge in providing an effective and convenient transition joint for transitioning from the underground plastic pipe to a threaded metallic fitting projecting above ground has received considerable attention. It has been common practice to manufacture fully assembled transition fittings, known in the industry as transition risers, which provide a vertical portion of which, when installed, extends above ground and an underground portion which has projecting therefrom a length or tail of plastic pipe which is fused or otherwise joined on site to previously laid underground plastic pipe. Factory assembly of such risers allows for the convenient use of completion tools which are often cumbersome and which could not be conveniently transported to the field for practical use in the completion of any great number of risers at different geographical locations.

The transition riser pipe 14 is fabricated at the factory typically by bending a length of metallic pipe into an L-shape to provide a horizontal run (not shown) and turning upwardly to form a vertical run which terminates at its upper end with external coupling threads 40. The interior of the vertical run is reduced in diameter by the finishing sleeve 42 which may conveniently be in the form of a sleeve telescoped into the interior of the pipe and welded in place. It will be appreciated by those skilled in the art that the interior diameter of the finishing sleeve 42 is selected in accordance with the particular characteristics of the plastic making up the plastic pipe 12, the diameter and wall thickness thereof, and the dimensions and configurations of the spigot 36. This technology by itself is known in the art and therefore will not repeated in detail herein.

Referring to FIGS. 3 and 4, the spigot 36 used with the subject invention is formed with an enlarged-in-diameter boss 54 having a pair of O-ring grooves formed in the periphery thereof for receipt of respective O-rings 56. The spigot is formed with an axially projecting nipple, shown generally at 60, and an internal axial bore 57 therethrough. The spigot nipple is formed with annular ribs 62 spaced axially apart to form therebetween annular grooves 64.

As shown in FIGS. 1 and 2, the tool 10 is preferably constructed to be relatively compact, typically having a frame on the order of 8 to 10 inches in length and about 3 inches in width. The frame 16 may be constructed generally of carbon steel and includes the top yoke 45 formed centrally with the threaded drive bore 58, a pair of vertical side rails 51 and 53 and, mounting at the bottom end, the oversized hex nut 68. Projecting laterally in one direction from the top yoke 45 is a handle 30 for convenient grasping of the frame. As will be appreciated by those skilled in the art, in certain applications it may be desirable to merely grasp the frame by one of the rails 51 or 53.

The drive rod 24 is conveniently formed with threads extending the full length thereof for downward travel to a desired extent through the threaded drive bore 58. Mounted on the top end of the drive rod is a hex shaped crown defining a drive head 26 which carries a laterally projecting hand grasp crank 28.

With particular reference to FIG. 1, a retainer fitting 32 is mounted from the lower end of the drive rod 24 which, in the preferred embodiment, includes a thrust bearing 33 for free rotational support of the depending retainer stem 34 which is sized for free telescopical receipt into the internal bore 57 of the spigot 36. The stem 34 is formed with a peripheral groove for receipt of a retainer O-ring 38 which is sized for frictional telescopical receipt within the spigot bore 57 to frictionally engage the walls thereof and removably retain the spigot on such stem.

Referring to FIG. 2, the clamping tool 22 for use with the finishing tool 10 of the present invention includes, generally, a pair of handles 43 joined by a vice grip style linkage incorporating an adjustment screw 45 and a pair of semi-circular jaws 46 formed on their interior with semi-circular gripping surfaces 47 for frictionally engaging the exterior wall of the plastic pipe 48.

In practice it will be appreciated that for the installation of a number of risers as, for instance at a new residential development area or for replacement of a utility distribution system throughout a single community, risers for the construction area will be prefabricated in an assembly line at the factory. Those risers will be fabricated with the finishing sleeves 42 in place and, depending on the particular applications, may be coated with a preservative coating and treated for cathodic protection. The spigots 36 will be fabricated at the factory and the number of riser pipes 14 and mating spigots 36 will be selected, packaged and shipped to the construction site.

Workmen, to achieve the completion of the transition fitting and final installation, will typically arrive at, for instance, a house where a gas meter is to be installed. An underground plastic gas distribution pipe will typically be left with a long extended termination link which projects into an excavation pit with a generous length of free flexible plastic pipe to be telescoped through the interior of the L-shaped riser pipe 14. The workmen may then select a riser pipe 14 and mating spigot 36 for that installation. The riser pipe 14 will be telescoped over the accessible length of plastic pipe 48 to the extent where the horizontal run (not shown) of such riser pipe 14 will be disposed horizontally at the bottom of the excavation pit with the vertical run thereof extending upwardly in the pit above ground level 13. The riser pipe is then in position for completion of the transition joint.

In operation, the tool 10 may then be taken from the workmen's tool kit and, as shown in FIG. 2, the tool may then be rotated to threadably engage the nut 68 to the external threads 40 of the riser pipe 14. The drive rod 24 is backed off to its vertical position, shown in FIG. 1, to provide clearance for the upper length of plastic pipe 48 to be telescoped through the clearance bore in the nut 68 to extend sufficiently far therethrough so that the jaws 46 of the clamping tool 22 may be positioned thereabout above the nut 68 to thus grip the periphery of such pipe to resist upward movement of the tool 10 relative to such pipe. The selected spigot 36 may then be telescoped over the stem 34 to be frictionally retained in place by means of the retainer O-ring 38.

The hand grasp crank 28 may then be grasped to rotate the drive rod 24 and advance the thrust fitting 32 downwardly to carry the depending spigot 36 into position over the open extremity of the plastic pipe 48. Continued advancement of the drive rod 24 will drive the nipple 60 of the spigot downwardly into the open extremity of the plastic pipe 48 to expand the wall thereof radially outwardly to form an expanded flare 50 having a diameter slightly larger than the interior diameter of the finishing sleeve 42. The spigot is driven downwardly until the facing shoulder of the boss 54 comes to rest on the top end of the plastic pipe.

Thereafter, the clamp tool 22 may be released to free the relative movement between the riser pipe 14 and the plastic pipe 12.

The crank 28 may again be grasped and the drive rod 24 advanced such that continued rotation of the rod 24 will draw the riser pipe upwardly relative to the plastic pipe 48. This then serves to draw the finishing sleeve upwardly around the expanded flare 50 thereby compressing the wall of the plastic pipe radially inwardly into the grooves 64 and about the ribs 62 of the spigot nipple 60 to thereby provide a gas tight seal between the spigot and the plastic pipe. This, coupled with the gas tight seal provided by the O-rings 56 of the boss 54 in the O-ring gland 49, provides for a positive gas tight seal between the plastic pipe 48 and the riser 14 while leaving the pipe thread coupling 40 exposed above ground and available for coupling to the gas meter (not shown).

The drive rod 24 may then be backed off to raise the thrust fitting and disengage the spigot 36. The tool handle 30 may then be grasped and the tool rotated to back the hex nut 68 off from the coupling threads 40.

The tool 10 may then be stored for the next usage. The completed transition riser 14 will then be left so that the excavation pit may be enclosed leaving the threads 40 exposed above ground level 13 for convenient access.

From the foregoing it will be appreciated that the completion tool of the present invention provides an economical, sturdy, and reliable means for the completion of a transition joint in the field by relatively unskilled workmen. The joint may be completed in an efficient and expeditious manner leaving a high integrity seal which will provide a long and trouble free service life.

While a particular form of the invention has been described, it will be apparent that various modifications can be made without departing from the spirit and scope of the invention.

What is claimed:

1. A gas meter riser field assembly tool for drawing a gas riser pipe with an internal finishing sleeve of a predetermined diameter over a flared out enlargement of a selected diameter less than said predetermined diameter and formed in the exposed extremity of a deformable plastic pipe by a completion spigot having a bore therethrough, said tool comprising:

an upstanding open frame formed with a central axis, a ring formed at the bottom end with a clearance bore aligned on said axis for passage therethrough of said plastic pipe;

a yoke at the top end of said frame formed with a threaded drive bore disposed on said axis;

a coupler for anchoring said ring to said top end of said riser pipe;

a hand grip on said tool frame; and a threaded drive rod screwed into said drive bore and including at its top end a driver and at its bottom end a thrust fitting for, upon advancement of said drive rod with said coupler attached to said top end of said riser pipe, engaging said spigot inserted in said top end of said plastic pipe to define said enlargement and, upon continued advancement of said drive rod, draw said riser pipe longitudinally relative to said plastic pipe, to draw said finishing sleeve over said enlargement to press the wall of said plastic pipe defining said enlargement radially inwardly on said spigot whereby said frame may be positioned on said riser pipe, said coupler actuated to couple it thereto and said drive rod advanced in said drive bore to engage said thrust fitting with said spigot to, upon further rotation, draw said riser pipe relative to said plastic pipe to draw said finishing sleeve over said flared out enlargement to press the wall of said plastic pipe defining said enlargement radially inwardly to form a gas tight seal between said spigot and said plastic pipe.

2. A field assembly tool as set forth in claim 1 for use in inserting a completion spigot of the type including axially spaced annular grooves and wherein:

said yoke, drive rod and coupler are configured and arranged to, with said coupler coupled to said top end of said riser, provide for upon advancement of said drive rod, engagement of said thrust fitting with said spigot to drive said spigot and plastic pipe sufficiently far into said riser pipe to cause the plastic in said wall forming said enlargement to be flowed into said grooves.

3. A gas meter riser field assembly tool according to claim 1 that includes:

a handle mounted on said frame to form said hand grip.

4. A gas meter riser field assembly tool according to claim 1 wherein:

said ring is in the form of an oversized hex nut.

5. A gas meter riser field assembly tool according to claim 1 wherein:

said thrust fitting includes a thrust bearing.

6. A gas meter riser field assembly tool according to claim 1 wherein:

said thrust fitting includes a reduced in diameter stem for frictional receipt in said spigot bore.

7. A gas meter riser field assembly tool according to claim 1 wherein:

said driver is formed with a hex shaped head.

8. A gas meter riser field assembly tool according to claim 1 wherein:

said driver includes a crank arm mounted thereon.

9. A gas meter riser field assembly tool for inserting a grooved completion spigot into the open end of a deformable plastic pipe of flowable plastic and projecting upwardly from a selected distance from the interior of an upstanding field assembly riser containing at its upper end an internal finishing sleeve of a predetermined interior diameter to flare the wall of said plastic pipe radially outwardly to form an enlargement of a diameter greater than said predetermined diameter, said tool comprising:

an open frame formed with a central axis and including at its bottom end a ring formed with a clearance bore disposed on said axis for free passage therethrough of said plastic pipe and including a coupler for coupling to said top end of said riser pipe, said frame including at its top end a yoke formed with a threaded drive bore disposed on said axis;

a threaded drive rod screwed into said drive bore and including on the bottom end thereof a spigot thrust fitting for engaging said spigot and on the top end thereof a driver;

a hand grip on said frame; and a clamping device for clamping said plastic pipe adjacent the top side of said ring to block movement of said plastic pipe relative to said tool whereby said hand grip may be grasped to place said tool with said clearance bore to receive said plastic pipe therein, said spigot placed over said open end of said plastic pipe and said driver engaged to rotate said drive rod to advance said spigot fitting into engagement with the end of said plastic pipe and to, upon further rotation of said drive shaft, drive said spigot into said open end to expand said plastic pipe to form said enlarged flare and said ring subsequently coupled to said top end of said riser pipe.

10. A gas meter riser assembly tool according to claim 9 that includes:

a handle mounted on said frame to form said hand grip.

11. A gas meter assembly tool according to claim 9 wherein:

said clamping device includes a pair of curved jaws for complementary receipt on the opposite sides of said plastic pipe.

12. A gas meter riser field assembly tool according to claim 9 wherein:

said spigot retainer fitting includes a thrust bearing.

13. A gas meter riser field assembly tool according to claim 9 wherein:

said thrust fitting includes a reduced in diameter spigot retainer.

14. A gas meter riser field assembly tool according to claim 9 wherein:

said driver is formed with a hex nut thereon.

15. A gas meter riser field assembly tool according to claim 9 wherein:

said driver includes a crank arm mounted thereon.

16. A field assembly tool for mounting on the top end of an upstanding riser pipe having an internal plastic pipe of flowable plastic and projecting telescopically a selected distance from the top end thereof, said riser pipe being of the type having an internal finishing sleeve near said end defining a finishing bore of a predetermined diameter and said plastic pipe including a spigot telescoped into the free end thereof to expand the walls thereof to define a flared out enlargement of selected diameter larger than said predetermined diameter, said tool comprising;

an upstanding frame formed with a central axis, a ring formed on the bottom end, including a coupler for attachment to the top end of said riser pipe and a clearance bore for free telescoping therethrough of said plastic pipe to dispose said enlargement above said ring and formed in its top end with a yoke defining a threaded drive rod bore;

a threaded drive rod disposed on said axis, screwed through said drive rod bore, and including on its top end a driver and on its bottom end a thrust fitting for, with said coupler attached to said top end of said riser pipe, advancement of said drive rod to engage the said thrust fitting with the top end of said spigot and advancement to draw said riser pipe telescopically upwardly relative to said plastic pipe to draw said finishing sleeve upwardly over said enlargement to flow the wall of said plastic pipe defining said enlargement radially inwardly against said spigot.

* * * * *